(12) United States Patent
Arbesman

(10) Patent No.: US 8,887,876 B2
(45) Date of Patent: Nov. 18, 2014

(54) BRAKE SHIM HAVING LUBRICANT COMPARTMENT

(71) Applicant: Ray Arbesman, Toronto (CA)

(72) Inventor: Ray Arbesman, Toronto (CA)

( * ) Notice: Subject to any disclaimer, the term of this patent is extended or adjusted under 35 U.S.C. 154(b) by 6 days.

(21) Appl. No.: 13/621,807

(22) Filed: Sep. 17, 2012

(65) Prior Publication Data

US 2013/0068574 A1   Mar. 21, 2013

(51) Int. Cl.
*F16D 65/38* (2006.01)
*F16D 65/097* (2006.01)
*F16D 65/00* (2006.01)

(52) U.S. Cl.
CPC ........ *F16D 65/0006* (2013.01); *F16D 65/0971* (2013.01)
USPC .................................. 188/73.37; 188/264 R

(58) Field of Classification Search
USPC ......... 188/73.37, 73.31, 250 E, 264 B, 250 R
See application file for complete search history.

(56) References Cited

U.S. PATENT DOCUMENTS

| | | | |
|---|---|---|---|
| 4,155,430 A * | 5/1979 | Kawamura | 188/73.37 |
| 6,257,379 B1 * | 7/2001 | Matsumoto et al. | 188/73.31 |
| 2003/0221919 A1 * | 12/2003 | Kumamoto et al. | 188/73.37 |

* cited by examiner

*Primary Examiner* — Melanie Torres Williams
(74) *Attorney, Agent, or Firm* — Patterson & Sheridan, LLP

(57) ABSTRACT

A shim for a disc brake pad is provided. The shim is formed of a generally planar metal sheet that has a plurality of curved or bent edge tabs extending out from its edges thereof to engage the brake pad. A centrally disposed raised area is provided on the shim. The raised area serves as a compartment for lubricant when the shim is retained on the brake pad. The raised area has at least one lubricant access port to allow lubricant to be introduced into the compartment without removing the shim from the brake pad. A disc brake pad assembly having the shim is also provided. A method of lubricating the assembly via the access port is also provided.

15 Claims, 5 Drawing Sheets

BRAKE SHIM HAVING LUBRICANT COMPARTMENT

CROSS-REFERENCE TO RELATED APPLICATIONS

This application claims benefit of Canadian patent application number 2,752,900, filed Sep. 19, 2011, which is herein incorporated by reference.

BACKGROUND OF THE INVENTION

1. Field of the Invention

The invention relates to brake shims and more particularly to lubricating systems for shims.

2. Description of the Related Art

To reduce noise and vibration in modern brake systems, it has become increasingly common to use shims. In its simplest form, a shim is a thin sheet of metal which is clipped, riveted or adhered to the back of a backing plate away from its friction side. The shim acts as an intermediate element (or buffer) between the backing plate and piston of the braking system. The piston contacts the shim instead of the backing plate directly. The shim takes on a portion of the force, thereby preventing noise and vibration when the brake is applied.

Some shim systems use tabs on the edges to retain the shim to the backing plate. This is believed to be particularly advantageous over fixed shims as the clips allow the shim to move slightly against the backing plate. However, the metal shim scraping against the metal backing plate can itself cause noise and vibration.

To remedy this, some shim manufacturers have resorted to using rubber, cork, ceramic or other materials for sound-dampening and to reduce heat transfer that can result from the friction. Others use a greasy lubricant between the shim and the backing plate. The lubricant must be applied by hand when the brake pad is installed. The technician squeezes lubricant onto the shim and smears to cover before clipping the shim onto the back of the brake pad. To apply fresh lubricant, the shim must be disassembled from the pad and then re-clipped into place after the lubricant has been applied. Over time, taking off and putting on the shim tends to weaken the side tabs. They can become less springy, or deform or even break off entirely. Since the tabs frictionally grip the edges of the backing plate, removal and re-insertion of the shim also means scraping along the edges of the backing plate which can cause wear over time.

Depending on its viscosity, the lubricant has a tendency to either sit in one spot on the shim, or drain or leak out of the space between the shim and the plate, in each case resulting in loss of efficacy of the lubricant. To address this, some manufacturers have developed complicated multi-shim arrangements—an inner shim with a cut out section encased in or overlapped by an outer (non-cut out) shim. The cut out sections on the inner shim are intended to act as reservoirs, each holding a small amount of the lubricant. Such an arrangement is not optimum due to the added manufacturing costs of the second shim.

It would be desirable to address or ameliorate the foregoing problems by providing a simple single tab-style shim that includes a compartment for lubricant, and the compartment having one or more access ports to allow lubricant to be inserted while the shim is in place. This would permit maintenance without removal, so that the life of the shim can be extended.

SUMMARY OF THE INVENTION

According to a first aspect of the invention, a shim for a disc brake pad is provided. The shim comprises a generally planar metal sheet, having a plurality of curved or bent edge tabs extending out from its edges. The tabs serve to engage the brake pad. The sheet has a centrally disposed raised area in which is defined at least one lubricant access port. The raised area serves as a compartment for a lubricant introduced via the at least one access port while the shim is retained on the brake pad.

The raised area may have a flat top surface (with perpendicular or sloped side surfaces). The raised area (seen from above) may have a generally circular, oval or elliptical shape; or a generally square or rectangular shape. The raised area may have a domed shape. With the access port(s), the raised area may have a nipple shape, or an inverted nipple shape.

Preferably, the raised area has exactly one access port. The access port may have any suitable shape for receiving a liquid or semi-solid lubricant. Preferably, the access port is circular. The access port may have edges that are slightly turned in (toward the underside or bottom of the shim) for better retention of lubricant.

Preferably, the raised area is disposed more or less centrally on the shim (i.e. not at or near the edges of the shim). The raised area is preferably surrounded by flat shim surface. Preferably, when the shim is installed in a brake assembly having a brake piston, the piston will strike an area of the shim around the raised area. Preferably, the piston does not contact the raised area.

According to another aspect of the invention, a shim and brake pad assembly is provided. The assembly comprises a shim (a generally planar metal sheet, having a plurality of curved or bent edge tabs extending out from its edges; and having a centrally disposed raised area in which is defined at least one lubricant access port); and a brake pad (a backing plate attached to a friction material). In the assembly, the edge tabs of the shim grip corresponding edges of the backing plate opposite the friction material to retain the brake pad and shim together in a sandwich. The raised area of the shim serves as a compartment for receiving a lubricant introduced via the at least one access port. The compartment is not a sealed compartment. The design is such that the lubricant is permitted to gradually disperse in the space between the shim and the backing plate.

According to a further aspect of the invention, a method is provided for lubricating a brake pad assembly having an attached tab-type shim. According to the method, an amount of lubricant is introduced via at least one access port defined in a raised area of the shim. The raised area of the shim serves as a compartment for receiving the lubricant and permitting it to gradually disperse in the space between the shim and the brake pad. This allows the assembly to be lubricated without removal of the shim from tabbed engagement with the brake pad.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
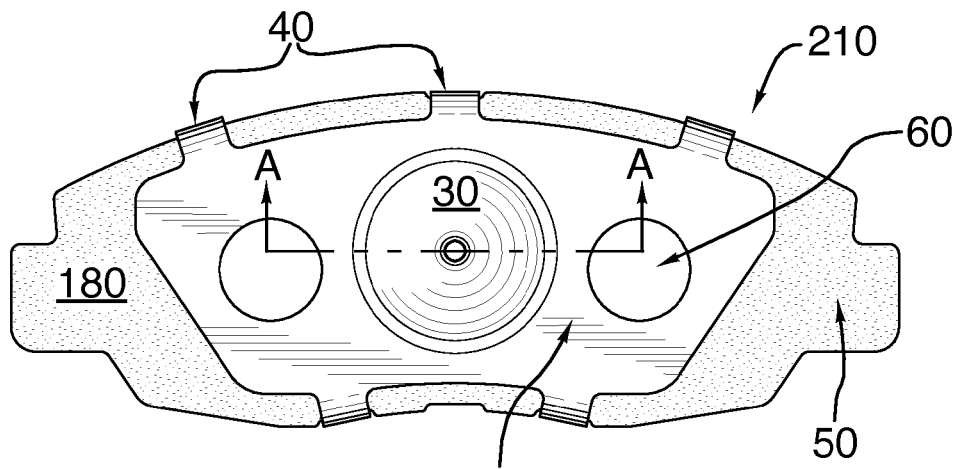
FIG. 1 is a top view of a brake backing plate and shim assembly.
Figure 2:
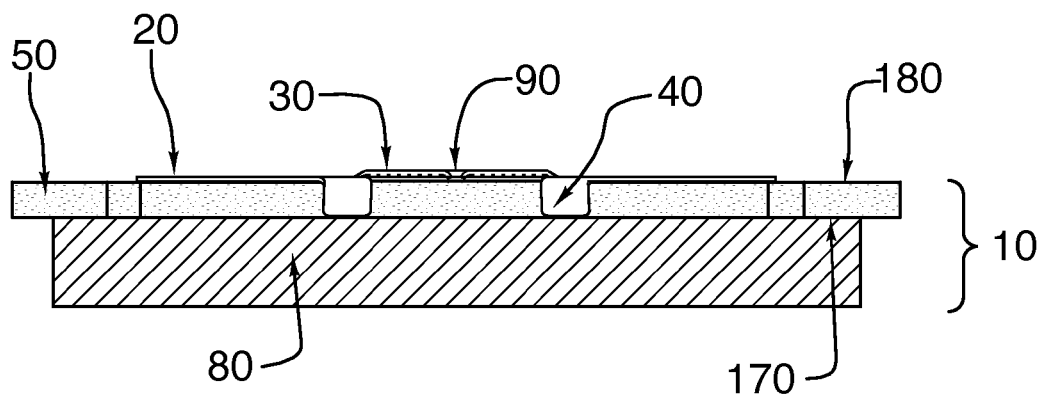
FIG. 2 is a side view of a brake pad and shim assembly.
Figure 3:
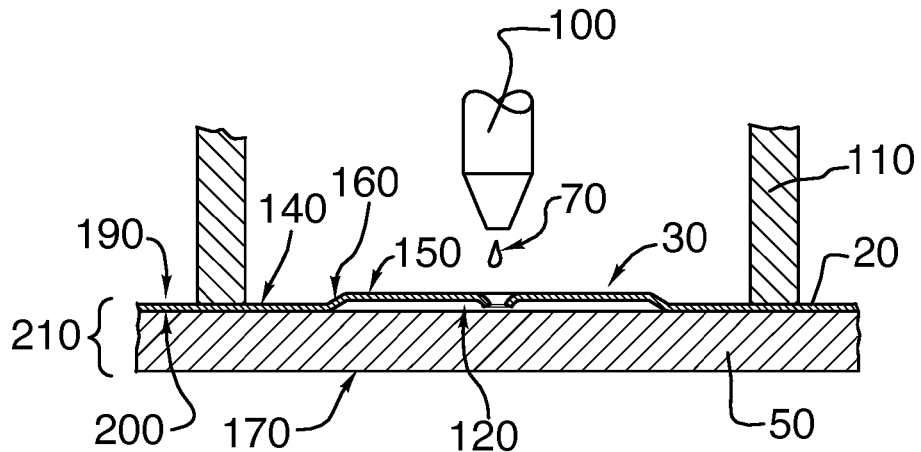
FIG. 3 is a cross-sectional view along lines A-A of FIG. 1.
Figure 4:
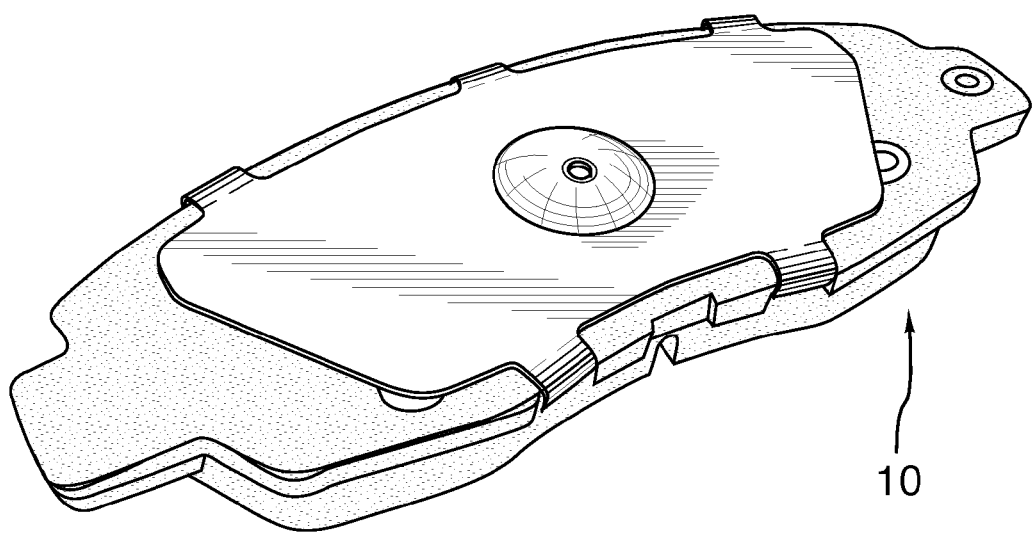
FIGS. 4-7 are photographs of a brake pad and shim assembly.
Figure 5:
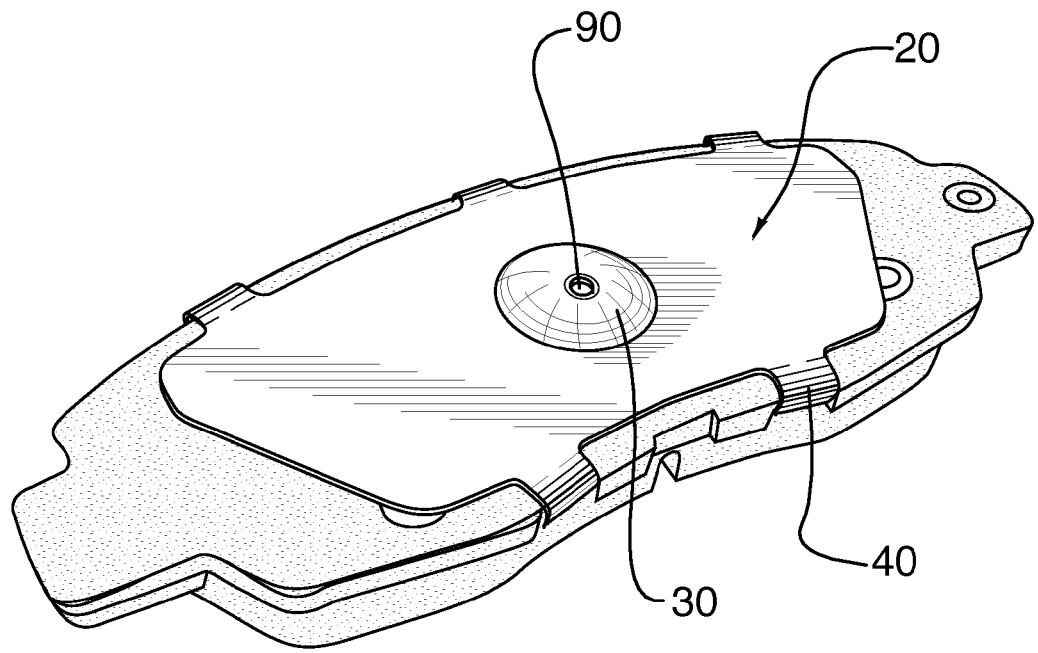
Figure 6:
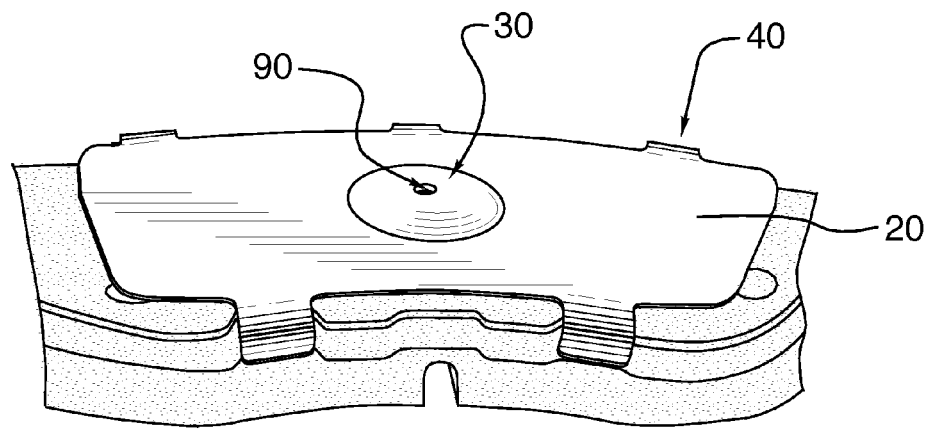
Figure 7:
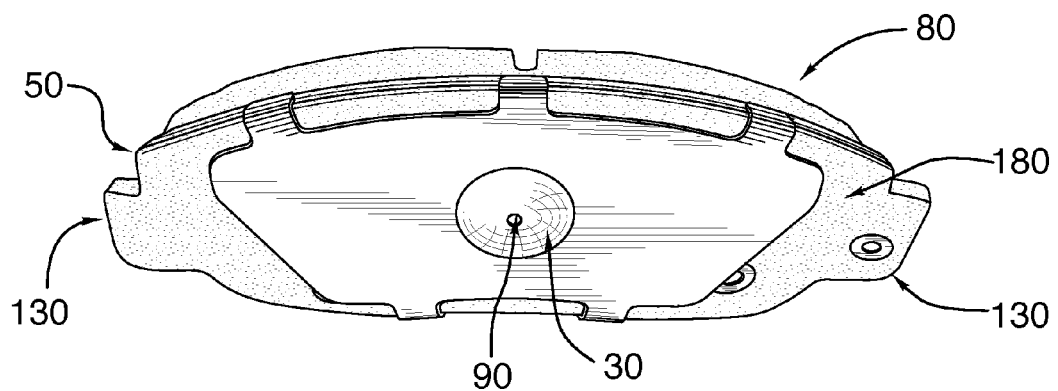
Figure 8:
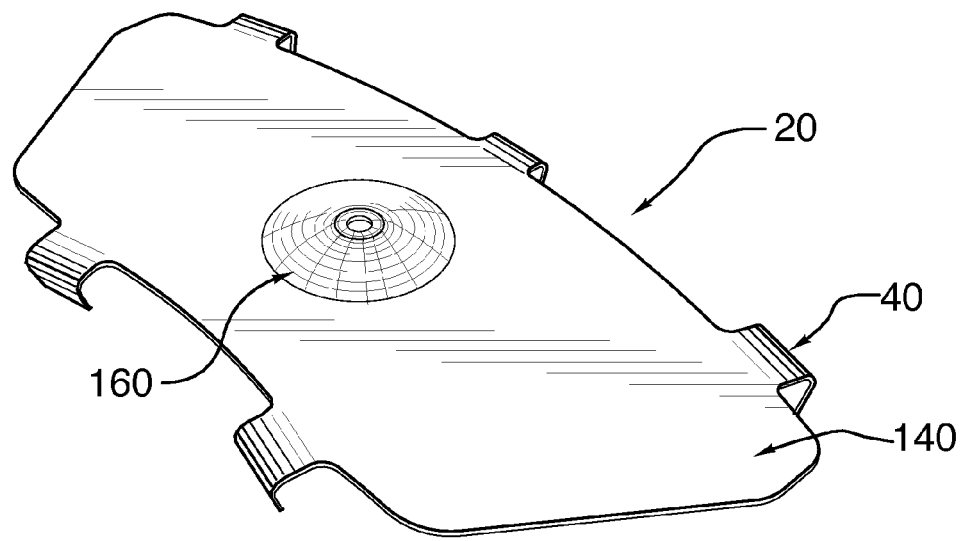
FIGS. 8-10 are photographs of a brake shim.
Figure 9:
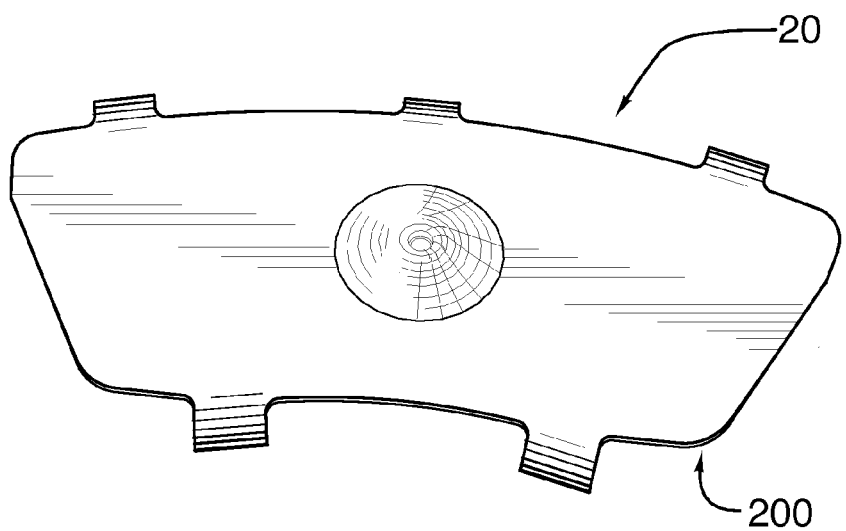

FIGS. 1 and 3 illustrate a brake backing plate and shim assembly 210 according to one possible embodiment of the present invention. FIG. 2 illustrates the assembly 10 of a finished brake pad with shim. The outline of the backing plate is preferably in accordance with the conventional shapes used in disc brake systems (according to standards set by manufacturers for each vehicle make and model).

The plate 50 is intended to be attached to a friction material 80 to form a brake pad. The plate has a shim facing side 180 and a friction facing side 170. Side 170 of the plate is exposed metal (not covered by friction material), and is substantially flat. The backing plate may have abutment portions 130 that stick out at the sides to allow the plate (as part of the finished brake pad) to be retained in certain brake calipers (not shown).

The shim 20, a sheet of thin metal, may be shaped to approximate the shape of the backing plate, as shown in FIG. 1, or it may be somewhat narrower, just covering the central part of the plate. The shim 20 has a smaller outside periphery than the backing plate. The shim may also be provided with other surface features (including holes or cut-outs 60, as shown in FIG. 1) to reduce heat or provide other lubricant retaining/distributing areas.

The shim 20 is retained against the plate 50 by bent tabs 40 on the shim which grip the edges of the plate and hold onto the plate by friction. The tabs 40 are preferably somewhat flexible allowing the shim 20 to be removed by prying it up and off the backing plate. As shown in FIGS. 4-7, the tabs of the shim may hook slightly inwards to better grip the plate. While retained, the shim can also move to a certain extent across the surface of side 180 of the backing plate 50, when under braking force, as the tabs are somewhat flexible and springy.

In order to reduce heat buildup and prevent noise and vibration due to the relative movement of the shim 20 and the backing plate 50 of the brake pad assembly 10, lubricant needs to be provided between these components.

Various lubricant types and formulations can be used. The viscosity and formulation should be selected to be suitable for lubricating a brake system (and may be, for example, a high heat bearing automotive lubricant).

The shim 20 has a (preferably centrally-located) raised area (or "bubble") 30 that provides an open interior compartment 120 to accommodate the lubricant. The bubble 30 may be domed as shown in FIGS. 4-10, or may be of another configuration (such as the generally flat-topped bubble 30 shown in FIGS. 1-3). Portions of the shim 20 beyond the edge of the bubble 30 preferably lie substantially flat against the backing plate 50, while the bubble stands slightly spaced away from the backing plate 50 to allow the lubricant to be received in between the two surfaces. The height of the bubble is preferably in the range of about 0.05" to about 0.1", although the selected height and other dimensions of the bubble will necessarily depend on the physical limitations and requirements of the particular application (including, for example the structure of the piston and caliper in the particular vehicle). In one possible embodiment, the bubble 30 may have a substantially flat top surface 150 and sloped or beveled side portions 160 (see FIG. 3).

The outside of the bubble 30 may be any convenient shape—rounded, square, rectangular, triangular. The piston 110 should strike on the generally flat areas 140 of the shim around the bubble 30 and not directly contact the bubble 30.

To bubble 30 has a (preferably centrally-disposed) access port 90. The access port 90 allows administration of lubricant 70 into the compartment 120 while the shim 20 is installed in position in the brake pad assembly 10. Lubricant 70 may be delivered by a service technician using a grease gun 100 (or other lubricant applicator), as understood by persons skilled in the art. One or more access port 90 openings may be provided in the shim. One access port 90 may be sufficient for most applications, and may be preferred to best contain the lubricant within compartment 120.

Figure 10:
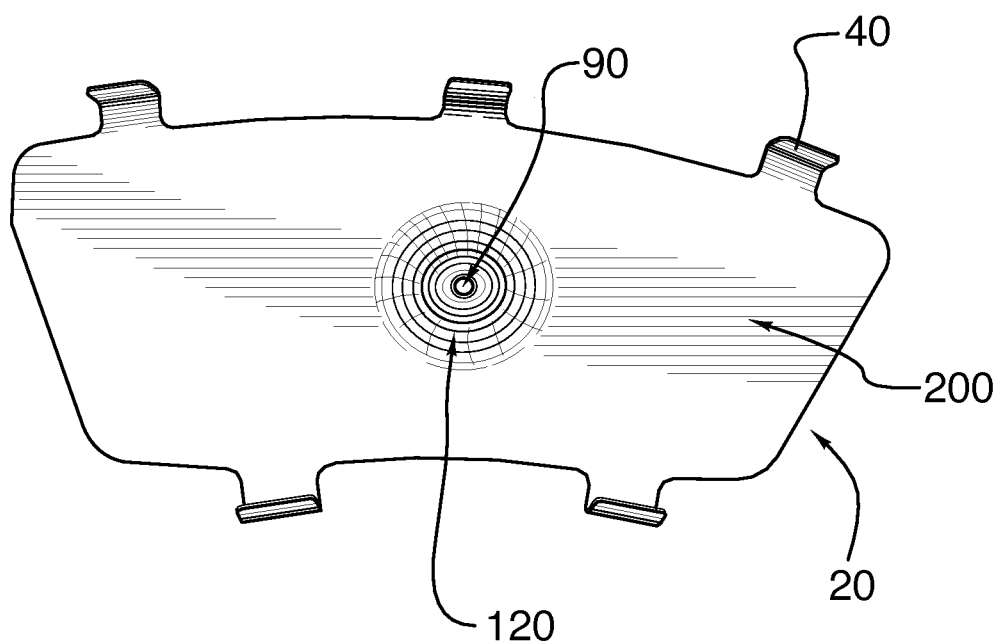

The lubricant 70 from the grease gun 100 flows through the access port 90 into the compartment 120 under bubble portion 30 of the shim. The access port may have turned edges as seen in FIG. 3 and FIG. 10 in order to guide the flow of lubricant into the compartment 120 and prevent loss of lubricant through that opening. This can be thought of as an "inverse nipple" shape. Alternatively, the edges of the access port 90 could be turned outward ("nipple" shape) as another way of guiding lubricant into the compartment.

The shim and backing plate are not sealed to each other. Accordingly, the lubricant that accumulates in the compartment 120 seeps out over time to coat the plate-facing side of the shim and the shim-facing side of the backing plate providing a greasy intermediate layer between the shim and backing plate that serves as a noise damping layer. The action of the piston on the slightly springy shim 20 may also drive (push) the lubricant out and across the surface of the backing plate.

As needed, the lubricant can be re-applied or topped up to prolong the life of the shim and backing plate. Because of the convenient access port 90, the shim need not be removed in order to apply fresh lubricant. This facilitates servicing the parts to keep them in good order, and ensures optimal performance over their life-cycle.

The bubble portion of the shim can be press-formed at the same time as the other features (e.g. side tabs) of the shim are formed. This avoids the need to make a second shim in order to create voids in which lubricant can collect. The access port can be formed by drilling or punching the metal of the shim blank, all processes well-understood in the art.

The foregoing description illustrates only certain preferred embodiments of the invention. The invention is not limited to the foregoing examples. That is, persons skilled in the art will appreciate and understand that modifications and variations are, or will be, possible to utilize and carry out the teachings of the invention described herein. Accordingly, all suitable modifications, variations and equivalents may be resorted to, and such modifications, variations and equivalents are intended to fall within the scope of the invention as described and within the scope of the claims.

What is claimed is:

1. A shim for a disc brake pad assembly comprising a backing plate, the shim comprising:
    a generally planar metal sheet, having a plurality of curved or bent edge tabs extending out from the edges thereof for engaging the backing plate; the sheet having a centrally disposed raised area in which is defined at least one lubricant access port;
    the raised area serving as a compartment for a lubricant, wherein the at least one lubricant access port allows administration of lubricant into the compartment while the shim is installed in the brake pad assembly.

2. The shim of claim 1, wherein the raised area has a flat top surface.

3. The shim of claim 1, wherein the raised area has sloped side surfaces.

4. The shim of claim 1, wherein the raised area has a generally circular, oval or elliptical shape.

5. The shim of claim 1, wherein the raised area has a generally square or rectangular shape.

6. The shim of claim 1, wherein the raised area has a domed shape.

7. The shim of claim 1, wherein the raised area with the at least one access port has a nipple shape.

8. The shim of claim 1, wherein the raised area with the at least one access port has an inverted nipple shape in order to guide the flow of lubricant administered into the compartment and help prevent loss of lubricant through that opening.

9. The shim of claim 1, wherein the raised area has exactly one access port.

10. The shim of claim 1, wherein the at least one access port is circular.

11. The shim of claim 1, wherein the at least one access port has edges that are slightly turned in for better retention of lubricant.

12. The shim of claim 1, wherein the raised area is disposed such that when the shim is installed in a brake assembly having a brake piston, the piston strikes an area of the shim around the raised area, and the piston does not contact the raised area.

13. A shim and brake pad assembly comprising:
a shim comprising a generally planar metal sheet, having a plurality of curved or bent edge tabs extending out from the edges thereof; the sheet having a centrally disposed raised area in which is defined at least one lubricant access port;
a brake pad comprising a backing plate attached to a friction material, wherein the edge tabs of the shim grip corresponding edges of the backing plate opposite the friction material to retain the brake pad and shim together in a sandwich;
wherein the raised area of the shim serves as a compartment for receiving a lubricant introduced via the at least one lubricant access port while the shim is retained in the sandwich with the brake pad, the lubricant being permitted to gradually disperse in the space between the shim and the backing plate.

14. A method of lubricating a brake pad assembly having an attached tab-type shim, comprising:
introducing an amount of lubricant via at least one access port defined in a raised area of the shim without removing the shim from the brake pad;
the raised area of the shim serving as a compartment for receiving the lubricant and permitting it to gradually disperse in the space between the shim and the brake pad.

15. The method of claim 14, wherein the method is performed using a grease gun.

\* \* \* \* \*

UNITED STATES PATENT AND TRADEMARK OFFICE
CERTIFICATE OF CORRECTION

| | | |
|---|---|---|
| PATENT NO. | : 8,887,876 B2 | Page 1 of 1 |
| APPLICATION NO. | : 13/621807 | |
| DATED | : November 18, 2014 | |
| INVENTOR(S) | : Ray Arbesman | |

It is certified that error appears in the above-identified patent and that said Letters Patent is hereby corrected as shown below:

Title Page, Foreign Application Priority Data:

Please insert --(30)      Foreign Application Priority Data

Sep. 19, 2011   (CA)...............2752900--.

Signed and Sealed this
Twenty-eighth Day of April, 2015

Michelle K. Lee
*Director of the United States Patent and Trademark Office*